United States Patent
Schymczyk et al.

(10) Patent No.: US 6,820,714 B2
(45) Date of Patent: Nov. 23, 2004

(54) HYDRAULICALLY SUPPORTED STEERING SYSTEM

(75) Inventors: Armin Schymczyk, Solingen (DE); Dirk Sickert, Bruehl (DE)

(73) Assignee: Visteon Global Technologies, Inc., Dearborn, MI (US)

(*) Notice: Subject to any disclaimer, the term of this patent is extended or adjusted under 35 U.S.C. 154(b) by 260 days.

(21) Appl. No.: 10/082,662

(22) Filed: Feb. 25, 2002

(65) Prior Publication Data

US 2002/0148670 A1 Oct. 17, 2002

(30) Foreign Application Priority Data

Feb. 23, 2001 (DE) .......................................... 011 04 338

(51) Int. Cl.[7] .............................................. B62D 5/00
(52) U.S. Cl. ........................ 180/442; 180/441; 180/417
(58) Field of Search ................................ 180/417, 418, 180/421, 441, 442; 91/375 A, 420, 445, 446; 60/384

(56) References Cited

U.S. PATENT DOCUMENTS

| | | | | |
|---|---|---|---|---|
| 4,006,792 A | * | 2/1977 | Bundschuh | 180/421 |
| 4,705,132 A | * | 11/1987 | Tsuchiya | 180/428 |
| 4,825,751 A | * | 5/1989 | Kervagoret | 91/420 |
| 5,135,068 A | * | 8/1992 | Emori et al. | 180/421 |
| 5,758,739 A | * | 6/1998 | Voss et al. | 180/403 |
| 6,415,885 B2 | * | 7/2002 | Sonoda | 180/422 |
| 6,520,278 B2 | * | 2/2003 | Wang | 180/421 |

* cited by examiner

Primary Examiner—Lesley D. Morris
Assistant Examiner—L. Lum
(74) Attorney, Agent, or Firm—Brinks Hofer Gilson & Lione

(57) ABSTRACT

The invention relates to a hydraulically supported steering system with a steering gear, which is driven by a hydraulic piston/cylinder unit. The steering system includes a piston. The piston is axially displaced in a cylinder and divides the cylinder into two cylinder chambers. Each cylinder chamber is connected to a separate hydraulic line that serves both as pressure supply line and as return line. The hydraulic lines are also connected to a servo valve. A throttle mechanism, which features a variable flow resistance in at least one flow direction is arranged in at least one hydraulic line. The flow of hydraulic fluid through the self-regulating throttle mechanism determines the flow resistance in this flow direction, namely a higher flow resistance will occur at low flow and lower flow resistance at high flow.

13 Claims, 3 Drawing Sheets

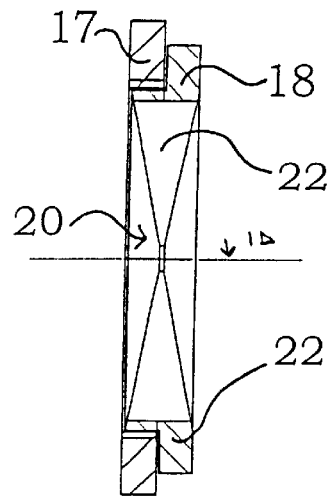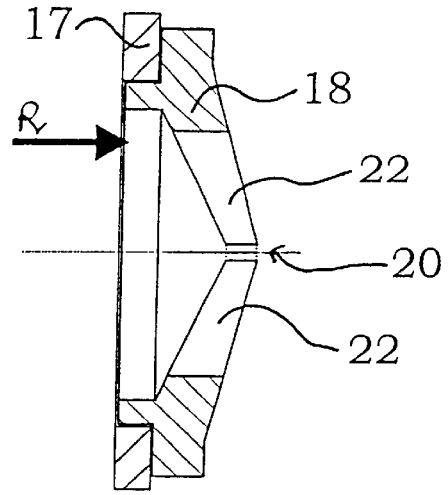
Fig 5    Fig 6
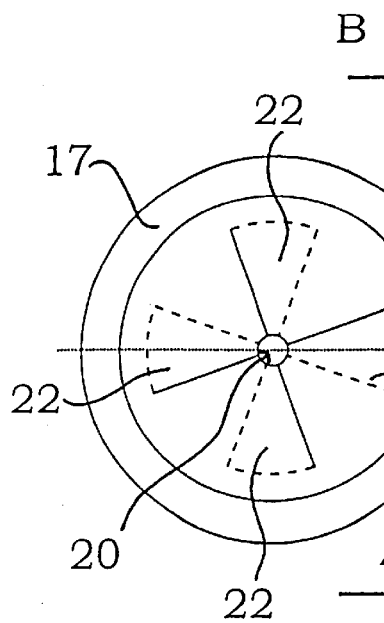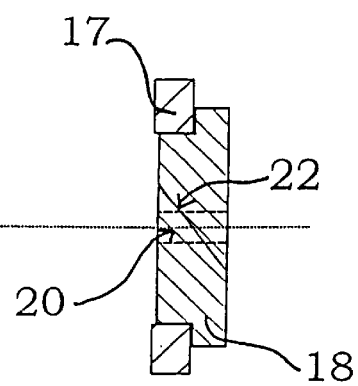
Fig 7    Fig 8

HYDRAULICALLY SUPPORTED STEERING SYSTEM

RELATED APPLICATIONS

This application claims priority to German patent application No. 01104338.7 filed Feb. 23, 2001.

TECHNICAL FIELD

The invention relates to a hydraulically supported steering system with a steering gear that is driven by a hydraulic piston/cylinder unit.

BACKGROUND

Hydraulically supported steering systems have been known for a long time. It is moreover well known that pronounced smooth running of the steering gear can positively effect a vehicle's handling characteristics. However, smooth-running steering gears make the entire steering system susceptible to oscillations. Therefore, it is necessary to use steering dampers to effectively combat the oscillations in the steering system. An example of a hydraulically operated steering stabilizer is illustrated in U.S. Pat. No. 4,467,884.

Furthermore, undesired noise can develop in hydraulically supported steering systems ("water line knocking") when erratic pressure changes appear in the hydraulic system and pressure peaks reach the system's return line. This can be caused for example, by external disturbances that act upon the steering wheel during driving. Hydrodynamic damping elements ("throttles" or "compensating volumes") are often used in hydraulically-supported steering systems for damping the undesired noise.

DE 28 38 151 A1, discloses a hydraulic piston/cylinder unit that can be used both as a steering system's hydraulic support as well as a steering damper. Additionally, DE 40 29 156 A1 discloses that in order to suppress undesired oscillation or erratic pressure changes in a hydraulically supported steering system in which the piston/cylinder unit also acts as a steering damper, damping valves that are only operative in the supply direction to the cylinder subchambers can be advantageously installed into the hydraulic lines of the piston/cylinder unit's cylinder subchambers.

It is furthermore known that to achieve optimum steering characteristics, it is advantageous for a hydraulically supported steering system to act as a function of speed. Large steering angle changes are often undertaken at low vehicle speeds (e.g., when maneuvering) in which a high internal damping in the hydraulic system is not desired High internal damping at low vehicle speeds in the hydraulic system thus limits the maximum flow of hydraulic fluid into the cylinder subchambers of the piston/cylinder unit, thereby limiting the unit's regulating speed. If the driver undertakes faster regulating movements, this will cause the hydraulic steering assistance to fail. At higher vehicle speeds on the other hand, not only is hydraulic support of steering motions not required because of the much smaller control forces, it can even cause a drop in driving stability due to its susceptibility to oscillations. At higher vehicle speeds, complete shut-off of the hydraulic steering assistance, or at least a higher damping effect of the piston/cylinder unit operating as steering damper, is desired.

An example of a speed-dependent steering system is disclosed in DE 28 38 151 A1. This disclosure proposes a steering system comprising of a piston/cylinder unit that only operates as a steering aid at low vehicle speeds and only serves as a steering damper at higher speeds. For this, the vehicle speed is analyzed by electronic means and the piston/cylinder unit is only pressurized when necessary. However, this device as disclosed in the patent, has a number of drawbacks, the device firstly requires detection of the vehicle speed and electrical or electronic evaluation of this information, and secondly requires an electrically controlled power-assisted device for pneumatic control. Both factors increase the cost, and the steering system's high complexity makes it susceptible to problems or failure, making it more difficult to use the system in the smaller sized cars.

EP 1 013 535 A1 discloses a hydraulically supported steering system, which works with variable throttle valves in the hydraulic supply lines to the cylinder subchambers, and whose flow resistance is determined from pressure difference between the pressure produced by the hydraulic pump and the pressure in the return line to the hydraulic fluid reservoir. The hydraulic pump is lock-synchronized with the combustion engine that drives the vehicle. Since the pressure generated by the hydraulic pump is a function of engine speed, the characteristic curve of the hydraulically supported steering system is a function of vehicle speed. However, the variable throttle valve that is required is mechanically expensive and requires extra hydraulic control lines, which make retrofitting difficult, particularly in existing old cars. Moreover, lock-synchronization of the combustion engine and hydraulic pump cannot be assumed in all cases, so the advantage of a steering system whose characteristic curve is a function of speed can't be realized in all vehicles.

Finally, DE 196 51 500 C1, discloses a damping valve arrangement for a hydraulic steering system. A check valve and a throttle valve are combined within one component, whereby the throttle valve's flow resistance adapts itself to the temperature-dependent viscosity of the hydraulic fluid. This is realized by using temperature-sensitive mechanical setting elements that vary the opening of a bypass path realized through throttle valve as a function of temperature. However, an adaptation of the throttle valve's damping action to the respective driving situation cannot be inferred from the disclosure.

SUMMARY

It is therefore an aspect of the present invention to have a hydraulically supported steering system whose piston/cylinder unit also acts as a steering damper. The damping characteristics of the unit automatically adapt themselves to the motor vehicle's driving situation at hand. It is another aspect to design the throttle mechanisms in such a manner that they can be manufactured at low cost and are easy to integrate into existing hydraulically supported steering systems.

In accordance with the teachings of the preferred embodiment, a steering system comprises a piston/cylinder unit that supports the steering gear's movement. The piston/cylinder unit comprises a piston, which is axially displaced within a working cylinder and divides the cylinder into two cylinder chambers. Each cylinder chamber is connected to a separate hydraulic line that serves both as pressure supply line and as a return line. Both hydraulic lines are also connected to a servo valve actuated by steering movements of the vehicle.

In another aspect of the invention, a self-regulating throttle mechanism, which features a variable flow resistance in at least one flow direction, is arranged in at least one hydraulic line. The flow of hydraulic fluid through the throttle mechanism determines the flow resistance of the self-regulating throttle mechanism in this flow direction. If there is a lower flow of hydraulic fluid through the throttle mechanism, then a higher flow resistance will arise and lead to an effective damping of oscillations and erratic pressure changes in the hydraulic system.

A lower flow of hydraulic fluid will occur, when the driver undertakes small driving angle corrections at higher vehicle speeds. There will consequently be less hydraulic support of the steering system at higher vehicle speeds, this will have a positive effect on the vehicle's handling characteristics, especially on its driving stability. Moreover, disturbances on the vehicle's wheels will result in motions of the steering gear, motions that the piston/cylinder unit acting as steering damper will dampen, especially when the steering column hasn't been actuated. Without effective damping of the steering gear, these disturbances will transmit itself to the steering column in the form of a "knocking" that is uncomfortable to the driver. If the piston/cylinder unit acts as a steering damper, then only trivial compensating motions of the piston will occur within the working cylinder and they will be accompanied by only a small flow of hydraulic fluid into the cylinder chambers or out of the cylinder chambers, respectively.

When there is a high flow of hydraulic fluid through the self-regulating throttle mechanism, a small flow resistance will arise against it, so that an effective hydraulic support of the driver's steering movements will occur. A high flow will occur, when the driver makes maneuvers at the lowest speed. In so doing, the driver executes the largest steering angle changes in the shortest time. If the internal damping within the hydraulic system that supports the steering movements is too strong, it will lead to a less adequate supply of hydraulic fluid into the cylinder chambers, such that the supporting force that the piston/cylinder unit exercises on the steering gear will decline significantly. In this case, the driver must use greater force in his/her steering movements, which causes negative effects on riding comfort. According to invention, the throttle mechanism is designed in such a manner that a lower flow resistance will occur through the throttle mechanism under the above described conditions. This will ensure that full hydraulic support will be available, even for strong steering movements.

An analogous mode of operating the throttle mechanism occurs when the throttle mechanism's hydrodynamic damping with the characteristic curve described above adapts itself to the speed of the pressure change in the hydraulic line between servo valve and throttle mechanism or to the size of the dynamic pressure difference occurring in front of or behind the throttle mechanism, rather than reacting to the flow of hydraulic fluid through the throttle mechanism.

In another embodiment, the throttle mechanism only demonstrates one flow path. This greatly reduces the structural and production engineering cost of the throttle mechanism in comparison to the multipath damping valves known.

Special advantages result when the flow resistance through the throttle mechanism in flow direction basically changes continuously with the flow of hydraulic fluid by means of a suitable design of the throttle mechanism. The characteristics of the hydraulically supported steering system continuously adapt themselves to the driving requirements by means of the continuous change of the hydraulic system's internal damping, especially of the piston/cylinder unit serving as steering damper, without the driver perceiving an abrupt change in the steering characteristics that he/she would sense as disturbing.

Other advantages result when the self-regulating throttle mechanism demonstrates an asymmetrical flow-resistance characteristic curve in relation to the hydraulic fluid's flow direction, namely a "blocked direction" and a "flow-through direction". It is particularly advantageous for this type of self-regulating throttle mechanisms to be arranged in both hydraulic lines. In respect to the pressure intake in the cylinder chambers, the throttle mechanisms are each advantageously arranged in the flow-through direction. Such a fitting arrangement makes it possible to quickly fill the particular cylinder chamber that is contributing to a force on the steering wheel in support of the steering motion, so that the full hydraulic supporting force is available, even for rapid steering motions. The high damping required for a steering damper occurs in the opposite flow direction.

Throttle mechanisms that demonstrate a high flow resistance in the blocked direction up to the hydraulic fluid's maximum flow, in other words throttle mechanisms that realize high internal damping, can be used as an auxiliary comfort and safety feature. It is of particular advantage for the flow resistance in this blocked direction to remain essentially constant, independent of the flow of hydraulic fluid, until a threshold is reached. When the maximum flow is exceeded, however, the throttle mechanism "opens" into a "safety state;" i.e., its flow resistance advantageously drops jump-like to a low value to realize the hydraulic system's full supporting action.

In a particularly simple embodiment of the hydraulically supported steering system, the self-regulating throttle mechanism demonstrates, in the flow direction, a flow-through state with little flow resistance and a damping state with elevated flow resistance. These two states of the throttle mechanism already permit the elementary functions of the steering system according to invention to be realized, namely high internal damping at higher speeds and low internal damping for strong steering motions.

The embodiments that are explained in more detail in the examples also realize additional significant cost advantages for manufacturing and implementing the throttle mechanisms. They consist of few parts, inexpensive to manufacture, and can be designed in such a manner at low cost that they can be integrated into existing designs of hydraulically supported steering systems without the need to make major changes. In particular, this opens up the advantageous possibility of retrofitting older vehicles simply and inexpensively.

The above object and other objects, features, and advantages of the present invention will be readily appreciated by one of ordinary skill in the art in the following detailed description of the best mode for carrying out the invention when taken in connection with the accompanying drawings.

BRIEF DESCRIPTION OF THE DRAWINGS

FIG. 5 is a cross-sectional view of a second embodiment of the throttle mechanism along line A—A in FIG. 2;

FIG. 6 is a cross-sectional view of a third embodiment of the throttle element along line A—A in FIG. 2;

FIG. 7 is a representation of the fourth embodiment of the throttle mechanism with stayed diaphragm segments; and FIG. 8 is a cross-sectional view of the throttle mechanism depicted in FIG. 7 along line B—B.

The following description of the preferred embodiment is merely exemplary in nature, and is in no way intended to limit the invention or its application or uses.

DETAILED DESCRIPTION OF THE PREFERRED EMBODIMENTS

Figure 1:
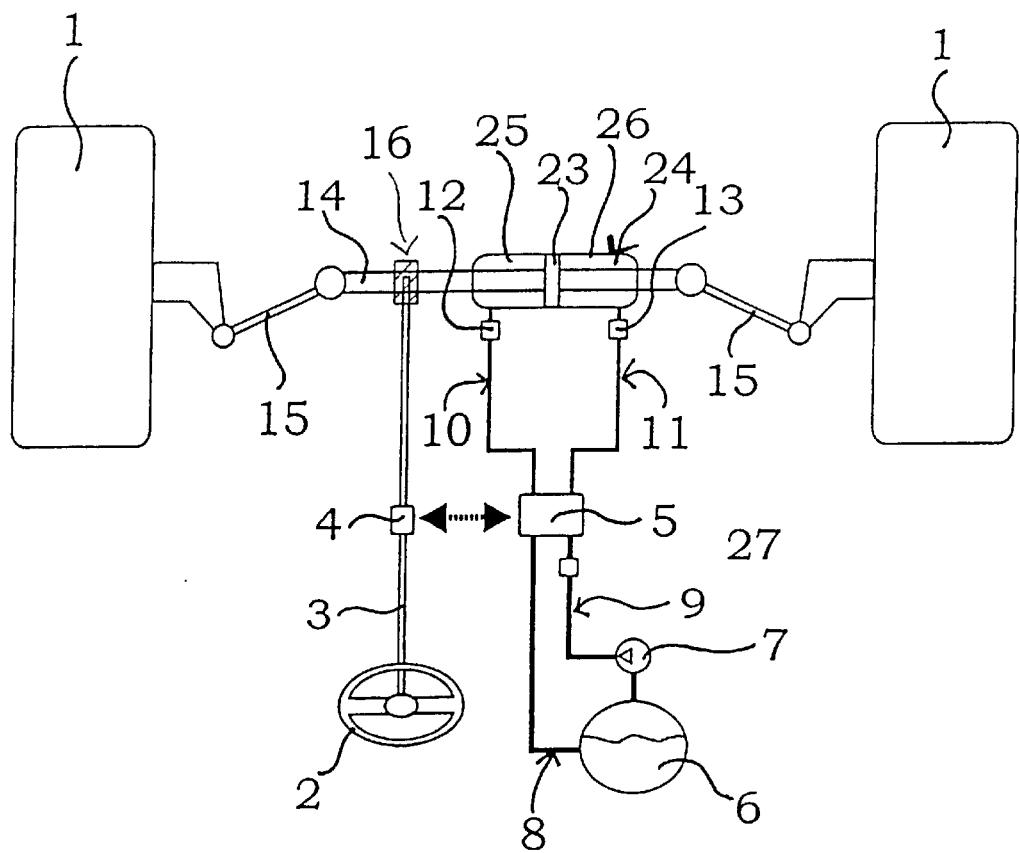
FIG. 1 is a schematic illustration of a hydraulically supported steering system.

The design of a hydraulically supported steering system is shown schematically in FIG. 1. The steering column 3 transmits the driver's steering movements on a steering wheel 2 to a pinion 16. The pinion 16 engages teeth that are designed on the steering rack 14. Rotation of the steering wheel 2 consequently results in a translation movement of the steering rack 14. This translation movement, which tie rods 15 transmit to the vehicle's wheels 1. This movement changes the angle of incidence of the wheels 1 to the vehicle's longitudinal axis.

A piston/cylinder unit, consists of a piston 23 that moves within a working cylinder 24 and divides the cylinder 24 into two cylinder chambers 25, 26. The piston 23 hydraulically supports the translation movement of the tie rod 15. Hydraulic lines 10, 11 are adapted to pressurize both cylinder chambers 25, 26 with a hydraulic fluid. The hydraulic lines 10, 11 are connected to a servo valve 5, whose setting is influenced by a steering angle sensor 4. The steering angle sensor 4 is arranged on steering column 3 and senses the driver's steering movements. A hydraulic pressure line 9 connects one side of the servo valve 5 to a power-steering pump 7 that delivers the accumulated hydraulic fluid into a return reservoir 6. The function of servo valve 5 is well known in the art and is not described in detail. A pressure accumulator reservoir (not shown here), which collects the pressurized hydraulic fluid, can also be arranged between power-steering pump 7 and servo valve 5. A hydraulic line 8 connects the other side of servo valve 5 to the return reservoir 6. Preferably, each of the at least one hydraulic lines 10, 11 is able to serve as both a pressure supply line and as a pressure return line. However, the invention does not require a hydraulic line 10, 11 to serve as both a pressure supply line and as a return line.

When the driver steers the wheels 1, servo valve 5 connects one of the cylinder chambers 25, 26 to hydraulic pressure line 9 and one of the cylinder chambers 25, 26 (e.g., 26) to hydraulic line 8. For example, the cylinder chamber 25 may be connected to hydraulic line 9, and the cylinder chamber 26 to hydraulic line 8. This ensures that the flow of pressurized hydraulic fluid flows from cylinder chamber 26 and into cylinder chamber 25. The flow of the hydraulic fluid from one chamber to another results in a force on steering rack 14, which operates in a direction from the cylinder chamber 25 toward the cylinder chamber 26 and supports the movement of the wheels 1. The flow cross section of the servo valve 5 is a function of the turning rate of the steering column 3 in such a way that a high flow of hydraulic fluid will occur into or out of cylinder chambers 25, 26, respectively, when there are rapid steering motions.

With continued reference to FIG. 1, the throttle mechanisms 12, 13 are disposed in the hydraulic lines 10, 11 so that the disturbances operating on the wheels 1 during driving, will not lead to oscillations or erratic pressure jumps in the hydraulic system. The use of only one throttle mechanism 12 can be sufficient in principle, but better results can be attained with at least one throttle mechanism per hydraulic line 10, 11.

Figure 2:
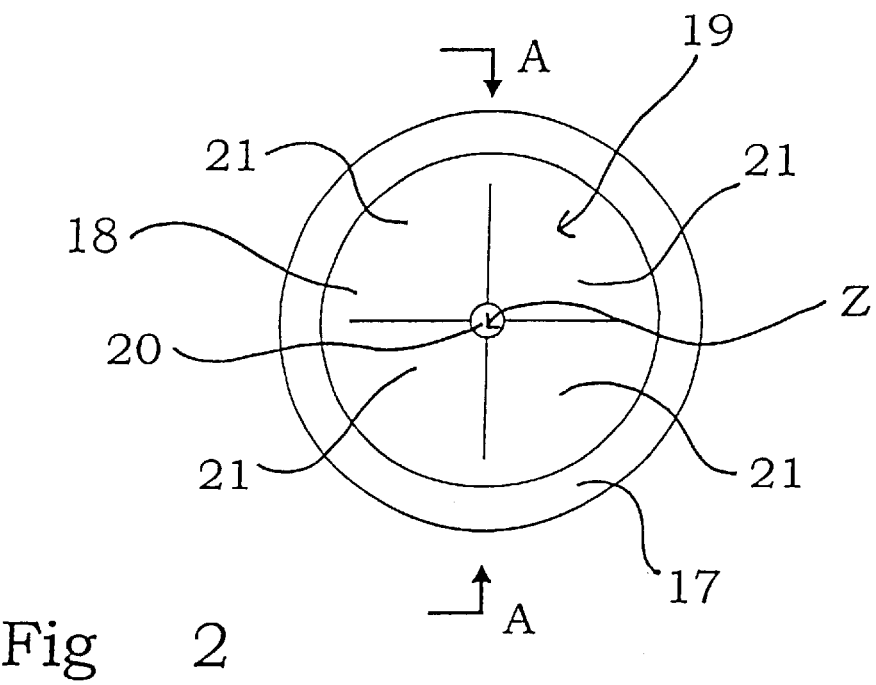
FIG. 2 is a first embodiment of a throttle mechanism according to the invention.

Referring in particular to FIG. 2, the first embodiment of the throttle mechanisms 12, 13 is shown. The self-regulating throttle mechanism 12, 13 is made of a circular diaphragm 18 that resists the hydraulic fluid and is arranged perpendicularly to the flow direction in the hydraulic lines 10, 11. On its external perimeter, diaphragm 18 is fastened into a circular mounting 17. Within a central region 19, diaphragm 18 is also divided into several segments 21, which are arranged around a common center Z. Cut surfaces 22 (shown in FIG. 3), which run vertically, cut the circular diaphragm 18 into the four segments 21. The cut surfaces 22 do not extend as far as the external perimeter of diaphragm 18, so that the diaphragm 18 remains joined together in one piece. The longitudinal axis of the central boring 20, constructed within diaphragm 18, extends through the center Z, whereby the longitudinal axis is oriented in the flow direction.

The diaphragm preferably consists of a natural or synthetic rubber, such as NBR ("neoprene butylene rubber"), HNBR or a poly-styrene-butadiene-copolymer that resists the hydraulic fluid and is resistant to the temperature differences that occur during operation. In particular, many of the elastomeric materials used in the automotive industry as sealing materials for hydraulic systems can be used. Moreover, the use of permanently elastic metallic materials can be advantageous for diaphragm 18. The mounting 17 consists for example, of a metal like aluminum or a plastic, such as a thermoset plastic that likewise resists the hydraulic fluid and is resistant to the temperature gradient or differences.

The central boring 20 ensures that a finite flow resistance will occur, even when the flow of hydraulic fluid through the throttle mechanism 12, 13 is disappearing. It will also ensure that the servo valve 5 will not completely shut off the cylinder chambers 25, 26. This has a positive effect on the piston/cylinder unit as pure steering damper. However, a central boring 20 is not absolutely required.

Figure 3:
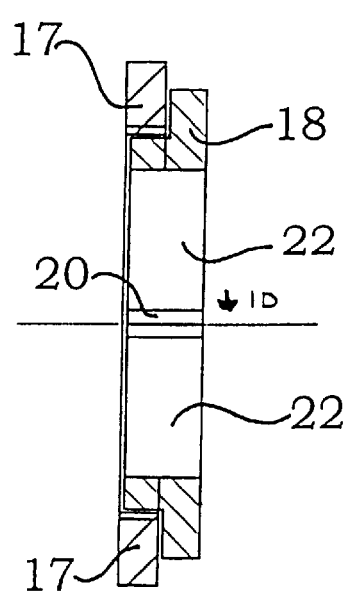
FIG. 3 is a cross-sectional view through the throttle mechanism along the line A—A in FIG. 2.

Referring in particular to FIG. 3, a cross-section view along the line A—A of FIG. 2 of the first embodiment of the throttle mechanism is shown. Diaphragm 18 is designed as a disc-shaped. Typical dimensions of the mounting are an outside diameter of about 10 millimeters and thin width of 8 millimeters. Diaphragm 18, which consists of NBR, demonstrates a thickness of several millimeters, preferably 1 to 2 millimeters depending on the flexibility of the material used for diaphragm 18. The diameter of the central boring 20 typically amounts to less than 1 millimeter. The diameter of central boring 20 determines the inside diameter ID of the flow path through the throttle mechanism in the illustrated state of rest. The diameter of the central region 19 of diaphragm 18, which is divided into segments 21, equals several millimeters, preferably about 5 millimeters. A division of diaphragm 18 into more or less than four segments 21 is of course possible and can be advantageous, depending on the application.

Figure 4:
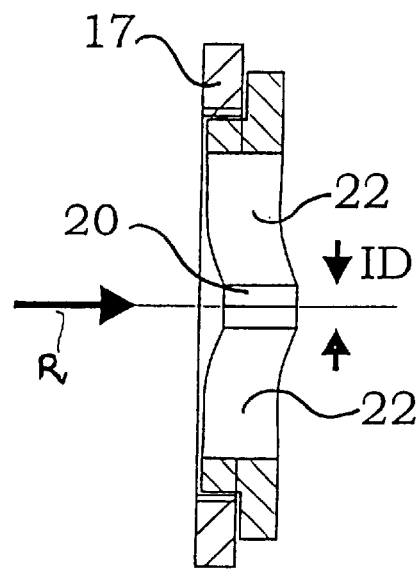
FIG. 4 is a cross-sectional view through the throttle mechanism wherein its flow resistance flow is reduced by a hydraulic fluid.

The deformation of diaphragm 18 that results from a flow of hydraulic fluid through throttle mechanism 12, 13 and the associated widening of the inside diameter ID of the flow path through throttle mechanism 12, 13 is shown in FIG. 4. When hydraulic fluid flows in the direction R indicated by an arrow, diaphragm 18 deforms itself elastically within its segmented central region 19, so that the inside diameter ID of the path of flow through throttle mechanism 12, 13 enlarges. Additionally, a flow of hydraulic fluid can occur through the adjacent segments 21. If the flow of hydraulic fluid increases in the indicated direction R, the widening of the inside diameter ID will correspondingly increase. If the flow drops again, the diaphragm 18 will relax back into its initial state.

Diaphragm 18 is built largely symmetrical in the shown example, so that a comparable characteristic curve of the flow resistance of the throttle mechanism 12, 13 exists in the two possible flow directions.

FIG. 5 represents a second embodiment of the throttle mechanism along the line A—A on FIG. 2. The basic geometry and all dimensions are comparable with those of the first embodiment. However, the diaphragm 18 demonstrates conical indentations on its two circular surfaces that reduce the diaphragm's thickness toward their center, which coincides with the common center Z of the segments 21. From this, it results that the thickness of segments 21 steadily increases outwardly from the center Z, whereby the inside diameter ID of the flow path through throttle mechanism 12, 13 increases more strongly when the flow of hydraulic fluid is low than when the flow is high. Since the hydrodynamic damping action of throttle mechanism 12, 13 is mainly determined by the cross section of the flow path, which itself is a quadratic function of the inside diameter ID, a change of damping action that is basically proportional to the change of flow can be accomplished.

FIG. 6 shows a third embodiment of the throttle mechanism along the line A—A in FIG. 2. Diaphragm 18 is not designed disc-shaped in this case, but demonstrates the shape of the envelope of a cone, wherein the tip of the cone lies on a line that is oriented in the flow direction and has center Z, that is, the cone's axis is aligned co-linearly with the flow direction in the hydraulic line 10, 11. In analogy to the examples above, cut surfaces 22 standing vertical to the plane of mounting 17, divide the diaphragm 18 into four segments 21. Moreover, the envelope's wall thickness decreases toward the cone's tip, whereby a damping characteristic comparable to that of the second example is achieved.

The conical design of diaphragm 18 achieves an asymmetrical damping behavior of throttle mechanism 12, 13 in relation to the hydraulic fluid's flow direction. The flow resistance/flow characteristic curve of throttle mechanism 12, 13 in the flow direction indicated by the arrow R in FIG. 6 basically corresponds to that of the second embodiment. But an increase of flow through the throttle mechanism in the opposite flow direction does not lead to an enlargement of the flow path's inside diameter ID, because the segments 21 can't "bend apart" due to their mutual support. The inside diameter ID remains practically constant up to maximum flow; i.e., throttle mechanism 12, 13 realizes a high flow resistance that is basically independent of the flow and whose size, in practice, is determined only by the diameter of the central boring 20. If a maximum flow is exceeded, however, then there occurs such a strong force on segments 21, that they will deform elastically and release the flow path. A reversible "safety state" which occurs in such situations, permits a high flow of hydraulic fluid at low flow damping.

The third embodiment accordingly realizes a self-regulating throttle mechanism, which demonstrates flow resistance in a first flow direction called the "flow-through direction" that continuously declines as the hydraulic fluid increases, that is, a "flow-through state" is present here. In the opposite flow direction, the self-regulating throttle mechanism demonstrates a "blocking state" with quasi-constant high flow resistance. The throttle mechanism 12, 13 switches into a "safety state" with small flow resistance when a maximum flow is exceeded. This case realizes all functions with a single flow path and the simplest mechanical design.

The throttle mechanisms 12, 13 depicted in FIG. 6 are installed into the two hydraulic lines 10, 11, whereby in the supply direction they are oriented in the flow-through direction to their respective cylinder chamber 25, 26. This ensures that a low flow resistance in the supply and permits a high regulating speeds for the piston/cylinder unit. Moreover, a mechanical support of segments 21, which limits the regulating flow cross section/flow resistance at high flows of hydraulic fluid, can be of advantage. A cage is connected to the mounting 17 and forms bearing surfaces for the maximally deflected segments 21, and in this manner mechanically prevents further enlargement of the flow path's inside diameter ID.

FIG. 7 shows an alternative embodiment of cut surfaces 22. In this aspect the cut surfaces 22 gives the diaphragm 18 a higher resistance to premature widening of the flow path's inside diameter ID at higher flows of hydraulic fluid. As shown, the cut surfaces 22 are not perpendicular to the diaphragm's plane, but run completely through the center Z at an angle relative to the diaphragm's plane. The angle is preferably in the range of 30° and 60°. This accomplishes that segments 21 mutually support each other in the flow direction, preventing the segments 21 from "bending open" prematurely or too easily. FIG. 8 shows the cut surfaces along the line B—B, of FIG. 7.

The throttle mechanisms as shown in the Figs., have an advantage that the failure of one of the throttle mechanisms 12 or 13 will not cause the hydraulic system to fail. If diaphragm 18 is damaged so that it can no longer relax in its state of equilibrium, this will result in only a minutely reduced internal damping of the steering system. The reduced internal damping of the steering system is largely independent of the vehicle's driving condition and will not affect driving safety.

In addition, the throttle mechanisms 12, 13 depicted in FIG. 2 through 8 are temperature-compensated, that is, the temperature-dependent viscosity of the hydraulic fluid co-determines the adaptation of their flow resistance. At higher viscosities of the liquid, higher forces will occur on a screen that is oriented perpendicular to the flow direction. For the segmented diaphragm 18 of the throttle mechanisms 12, 13 according to invention depicted in FIGS. 2 through 8, these forces lead to stronger widening of the inside diameter ID, whereby a stronger reduction of flow resistance occurs at higher viscosities of the hydraulic fluid (=lower temperature) than at lower viscosities (=higher temperature). This results in a damping action that is smaller at lower temperatures than at higher temperatures. The throttle mechanisms 12, 13 can also be installed in hydraulic pressure line 9 to dampen undesired pressure bursts. This will suppress the known "water line effect" associated with noise generation.

In addition to the embodiments shown in FIGS. 2 through 8, there are still possible a large number of other embodiments of throttle mechanisms that demonstrate the flow resistance/flow characteristic curve. For example, a throttle mechanism based on a circular screen, wherein a ball that is mounted in the mechanism's center. The ball is preferably spring-loaded against a restoring force in and opposite the flow direction and is deflected from its rest state by the flow of hydraulic fluid. The screen's central boring is filled up depending on the diversion thereby varying the flow cross section through the screen.

Moreover, in the steering system according to invention, not only one or two, but even additional throttle mechanisms 12, 13 possessing the required characteristics, can be used. Utilization of several throttle mechanisms 12, 13 in one hydraulic line 10, 11 can be advantageous for very easy moving steering gears in order to realize the required hydraulic damping characteristics.

While the best mode for carrying out the invention has been described in detail, those familiar with the art to which this invention relates will recognize various alternative designs and embodiments for practicing the invention as defined by the following claims.

What is claimed is:

1. A hydraulically supported steering system with a steering gear, wherein the steering gear is driven by a hydraulic cylinder unit, the steering system comprising:
    a piston, axially displaced in a cylinder, wherein the piston substantially separates the cylinder into at least two cylinder section;
    at least one hydraulic line connected to at least one cylinder section, wherein the at least one hydraulic line is adapted to serve as at least one of the following: a pressure supply line and a pressure return line;
    a servo valve connected to the at least one hydraulic line; and
    a throttle mechanism disposed in the at least one hydraulic line, wherein the throttle mechanism is a self-regulating throttle mechanism having a variable flow resistance, in at least two variable resistance direction, such that a flow of a hydraulic fluid through the throttle mechanism in at least two direction determines the resistance in the at least two direction.

2. The steering system according to claim 1, wherein the throttle mechanism has only one flow path.

3. The steering system according to claim 1, wherein the variable flow resistance and the variable resistance direction are dependent on the flow of the hydraulic fluid through the throttle mechanism.

4. The steering system according to claim 1, wherein in the at least one flow direction the throttle mechanism demonstrates at least one flow-through state with low flow resistance and one damping state with elevated flow resistance.

5. The steering mechanism according to claim 1, further including at least two hydraulic lines, wherein the piston substantially separates the cylinder into two cylinder sections and each of the cylinder sections is connected to at least one of the at least two hydraulic lines.

6. A hydraulically supported steering system with a steering gear, wherein the steering gear is driven by a hydraulic cylinder unit, the steering system comprising:
    a piston, axially displaced in a cylinder, wherein the piston substantially separates the cylinder into at least two cylinder sections;
    at least one hydraulic line connected to at least one cylinder section, wherein the at least one hydraulic line is adapted to serve as at least one of the following: a pressure supply line and a pressure return line;
    a servo valve connected to the at least one hydraulic line; and
    a throttle mechanism disposed in the at least one hydraulic line, wherein the throttle mechanism is a self-regulating throttle mechanism having a variable flow resistance in a variable resistance direction, such that a flow of a hydraulic fluid through the throttle mechanism in at least one direction determines the resistance in the at least one flow direction;
    wherein said throttle mechanism has a flow-through direction and a flow-resistant direction, and the throttle mechanism providing greater resistance against fluid flowing at a specified flow rate in the flow-resistant direction than against fluid flowing at the specified flow rate in the flow-through direction.

7. The steering system according to claim 6, wherein the throttle mechanism demonstrates a high flow resistance in the flow-resistant direction that is independent of the flow of the hydraulic fluid.

8. The steering system according to claim 6, wherein in the flow-resistant direction the throttle mechanism changes over into a safety state with low flow resistance when a maximum flow is exceeded.

9. The steering system according to claim 6, wherein the throttle mechanism is disposed in the at least one hydraulic line, whereby the throttle mechanism is disposed in the flow-through direction in relation to a pressure intake in the cylinder sections.

10. A hydraulically supported steering system with a steering gear, wherein the steering gear is driven by a hydraulic cylinder unit, the steering system comprising:
    a piston, axially displaced in a cylinder, wherein the piston substantially separates the cylinder into at least two cylinder sections;
    at least one hydraulic line connected to at least one cylinder section, wherein the at least one hydraulic line is adapted to serve as at least one of the following: a pressure supply line and a pressure return line;
    a servo valve connected to the at least one hydraulic line; and
    a throttle mechanism disposed in the at least one hydraulic line, wherein the throttle mechanism is a self-regulating throttle mechanism having a variable flow resistance in a variable resistance direction, such that a flow of a hydraulic fluid through the throttle mechanism in at least one direction determines the resistance in the at least one flow direction;
    wherein the throttle mechanism is made of a diaphragm that resists the flow of hydraulic fluid, such that the diaphragm is arranged perpendicular to the flow direction.

11. The steering mechanism according to claim 10, wherein the diaphragm is in the form of a cone, whereby the cone's axis is aligned co-linearly with the flow direction in the at least one hydraulic line.

12. The steering system according to claim 10, wherein the diaphragm is divided into several segments substantially arranged around a common center.

13. The steering system according to claim 12, wherein the several segments of the diaphragm are defined by slits, and said slits are not substantially parallel with the flow of the hydraulic fluid.

* * * * *

UNITED STATES PATENT AND TRADEMARK OFFICE
CERTIFICATE OF CORRECTION

PATENT NO. : 6,820,714 B2
DATED : November 23, 2004
INVENTOR(S) : Armin Schymczyk et al.

It is certified that error appears in the above-identified patent and that said Letters Patent is hereby corrected as shown below:

Column 9,
Line 14, after "cylinder" delete "section;" and substitute -- sections; -- in its place.
Line 21, immediately after "flow resistance" delete "," (comma).
Line 22, after "resistance" delete "direction," and substitute -- directions, -- in its place.
Line 24, after "two" delete "direction" and substitute -- directions -- in its place.
Line 25, after "two" delete "direction." and substitute -- directions. -- in its place.

Signed and Sealed this

Third Day of May, 2005

JON W. DUDAS
*Director of the United States Patent and Trademark Office*

UNITED STATES PATENT AND TRADEMARK OFFICE
CERTIFICATE OF CORRECTION

PATENT NO.    : 6,820,714 B2
DATED         : November 23, 2004
INVENTOR(S)   : Armin Schymczyk et al.

It is certified that error appears in the above-identified patent and that said Letters Patent is hereby corrected as shown below:

<u>Column 9,</u>
Line 23, after "flow resistance" delete "," (comma).
Line 24, after "resistance" delete "direction," and substitute -- directions, --.
Line 26, after "two" delete "direction" and substitute -- directions --.
Line 27, after "two" delete "direction." and substitute -- directions. --.

Signed and Sealed this

Seventeenth Day of January, 2006

JON W. DUDAS
*Director of the United States Patent and Trademark Office*